United States Patent [19]

Stephenson

[11] Patent Number: 4,635,967

[45] Date of Patent: Jan. 13, 1987

[54] INTERNAL SEAL FOR INSULATED STEAM INJECTION CASING ASSEMBLY

[75] Inventor: Edgar O. Stephenson, Tacoma, Wash.

[73] Assignee: Kawasaki Thermal Systems, Inc., Tacoma, Wash.

[21] Appl. No.: 717,559

[22] Filed: Mar. 29, 1985

[51] Int. Cl.⁴ .............................................. F16L 55/00
[52] U.S. Cl. ....................................... 285/45; 285/47; 285/48; 285/53; 285/137.2; 285/334.2; 285/334.4; 285/917
[58] Field of Search ................ 285/47, 53, 138, 334.2, 285/334.3, 334.4, 48, 45, 917

[56] References Cited

U.S. PATENT DOCUMENTS

| | | | |
|---|---|---|---|
| 167,262 | 8/1875 | Lewis | 285/334.2 |
| 610,321 | 9/1898 | Davey | 285/334.2 |
| 1,125,324 | 4/1915 | Williams et al. | 285/334.2 |
| 1,359,142 | 11/1920 | Allison | 285/397 |
| 1,925,533 | 9/1933 | Havens | 285/398 |
| 2,766,998 | 10/1956 | Watts et al. | 285/334.2 |
| 2,766,999 | 10/1956 | Watts et al. | 285/334.2 |
| 3,188,117 | 6/1965 | Press et al. | 285/398 |
| 3,325,176 | 6/1967 | Latham et al. | 285/334.2 |
| 3,403,931 | 10/1968 | Crain et al. | 285/334.4 |
| 3,404,902 | 10/1968 | Latham et al. | 285/334.2 |
| 3,556,568 | 5/1968 | King | 285/334.2 |
| 3,574,357 | 4/1971 | Alexandru | 285/47 |
| 3,873,105 | 3/1975 | Wehner | 285/334.4 |
| 4,009,720 | 3/1977 | Crandall | 285/334.2 |
| 4,029,345 | 6/1977 | Romanelli | 285/334.2 |
| 4,415,184 | 11/1983 | Stephenson et al. | 285/47 |
| 4,470,609 | 9/1984 | Poe | 285/334.2 |
| 4,480,371 | 11/1984 | McStravick et al. | 285/47 |
| 4,518,175 | 5/1985 | Richards et al. | 285/47 |

Primary Examiner—Cornelius J. Husar
Assistant Examiner—Anthony Knight
Attorney, Agent, or Firm—Nies, Webner, Kurz & Bergert

[57] ABSTRACT

An insulated casing assembly for use in injecting steam into wells or transmitting steam from the generating source to the wellhead is disclosed. A plurality of interconnected casings are used, each casing have outer and inner tubular sections and an annular spacing between the two sections containing thermal insulation. Rigid weld rings connect and prevent relative movement between the corresponding ends of the two sections. A thermal and fluid sealing ring disposed between adjacent inner tubular section prevents ingress of steam into the coupling cavity. A threaded coupling screwed onto threaded ends of outer tubular sections joins adjacent casings together.

8 Claims, 2 Drawing Figures

INTERNAL SEAL FOR INSULATED STEAM INJECTION CASING ASSEMBLY

FIELD OF THE INVENTION

This invention relates generally to insulated casing for hot fluid transfer and more particularly to a new and improved insulated casing assembly for oil well steam injection or above ground steam transport which greatly reduces heat loss from the steam to the casing components.

DESCRIPTION OF THE PRIOR ART

Casing assemblies utilized to transfer fluids downhole must be constructed so as to be structurally rigid and leakproof while being capable of cyclic response to temperature changes of the fluid flowing through them. This is particularly true when the casing assembly is used to inject very high temperature steam into an oil well. The purpose of steam injection is to lower the viscosity of heavy crude oil so that it can be pumped or forced to the surface and thus extend recovery. The casing assemblies which are used in such a manner, however, are subject to several potentially destructive forces. Very high static internal and external pressure forces are exerted on the walls and couplings of the assemblies when inserted deep into the ground. Each casing is subjected to the axially directed force of the weight of the other casings suspended below it in the string. The corrosive effects and the pressure forces caused by the steam itself on the internal components of the assembly as well as the differential thermal expansion of such components caused by the high temperature of the steam and contamination by downhole fluids can cause structural failure of the casing assembly. Conventional insulated flowtubes leave the insulation susceptible to contamination by downhole fluids causing loss of insulating properties and potential failure of the permanent well casing due to overstressing. Another prior art approach encases the majority of the insulation in a sealed metal jacketing but leaves the joint area completely uninsulated to allow for joint makeup tooling. This uninsulated portion allows high heat transfer locally to the permanent well casing thus producing potential failure stresses in the casing. Another prior art approach encases the entire length with convention insulation of moderate K-factor but fastens the inner and outer tubular with a high conductivity coupling resulting in excessive heat loss and high temperatures at the outer tubular threads. Yet another prior art approach, as disclosed in U.S. Pat. No. 4,480,371, utilizes a cylindrical spacer member which is wedged into engagement against opposing flow tubes. It is found however that this arrangement does not provide an effective fluid seal.

A primary objective of the present invention is therefore to provide a new and improved insulating casing assembly for transferring high temperature fluids wherein insulation separating the fluid-carrying portion of each casing from the rigid portions is isolated and thus protected from the fluid.

Another object of the present invention is to minimize heat transfer from the inner tube or pipe to the outer tube or casing at the coupling area.

Another objective of the present invention is to provide a primary steam seal on the inner pipe which effectively prevents egress of the live steam into the coupling cavity and thus prevent contact of the steam with the casing coupling and coupling cavity insulation.

Another object of the present invention is to provide an insulated casing assembly in which couplings used to join adjacent casings provide a secondary seal which is protected from the high temperature fluid by the primary seal ring on the inner pipe assembly.

SUMMARY OF THE INVENTION

The present invention comprises an insulated casing assembly including a plurality of insulated casings which when coupled or strung together permit fluids of high temperatures and pressure to flow therethrough with low heat loss and without leakage. Each casing comprises radially spaced outer and inner tubular sections defining an annular space therebetween. The annular space is filled with thermal insulating material, preferably a high efficiency multilayered or microspere insulation. At the joints between casings, a flexible, high temperature resistant sealing ring engages opposing end surfaces of adjacent inner tubular sections to prevent fluid escape into the coupling cavity and to prevent steam migration through the coupling insulation. Additionally, an insulated filler ring may be fitted into the coupling cavity to inhibit heat transfer from the inner pipe to the outer casing coupling. A threaded coupling is screwed onto the ends of adjacent casings to rigidly maintain them in a longitudinally coaxial relationship.

DETAILED DESCRIPTION

Figure 1:
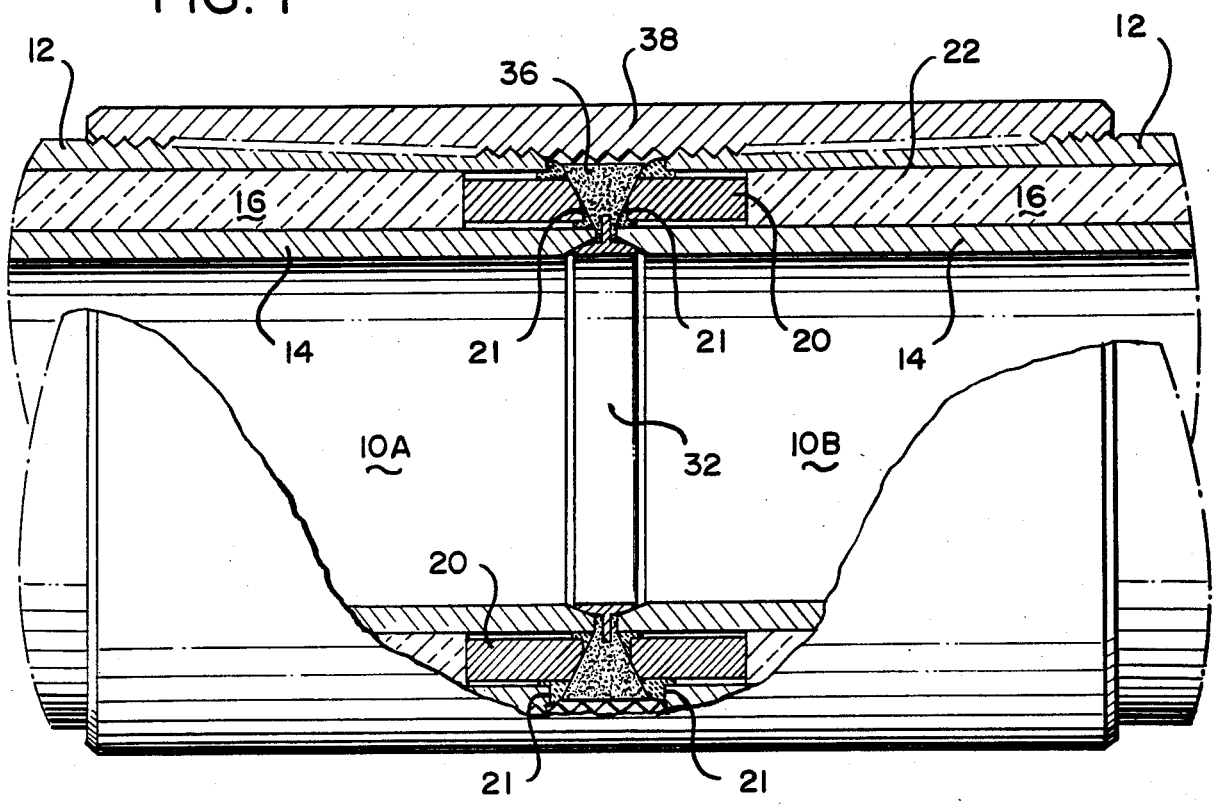
FIG. 1 is a fragmentary cross-sectional view of an insulated casing assembly including two casings joined together.

Referring now to FIG. 1, there is shown insulated casings 10A and 10B joined together to establish a conduit for transporting fluids, particularly high temperature fluids, over long distances with low heat loss and without leakage.

The outer wall of each casing is formed by an outer tubular section 12. The inner wall of each casing, which forms a flowtube through which fluids flow, is formed by inner tubular section 14. The inner and outer tubular sections are concentric and the radial spacing of the inner and outer section walls is such as to provide annular space 16 therebetween.

The specific material from which the tubular sections are made, as well as its grade and thickness, will vary with the conditions to which the casing is subjected. Several factors must be considered. The tubular sections should be constructed of a material which provides adequate structural support for the casing. When a primary use for the casing is to inject high pressure steam deep into the earth, the material must also be capable of withstanding the effects of excessive pressure, temperature, and corrosion. Further, if the tubular sections undergo welding during manufacturing, a material with a suitable weldability must be selected. Steel alloys of various types are examples of materials suitable for use in forming the tubular sections 12 and 14.

Annular space 16 at the ends of each casing is sealed by a weld ring 20 affixed to corresponding ends of the inner and outer tubular sections by continuous weldments, indicated at 21. The purpose of rings 20 is to seal the corresponding ends of the tubular sections while transferring the thermal expansion and contraction induced loads from inner tubular section 14 to outer tubular section 12. This sealing prevents any fluid which enters coupling cavity from entering annular space 16 and prevents back fill gas contained in this annulus from escaping and thereby adversely affecting the insulation value of the material therein.

Weld rings 20 can be made of any material which is sufficient to withstand the stresses induced by the thermal loading and steam pressure coupled with the downhold corrosive environment. Another consideration for the choice of weld ring material is that when the casing is used to convey high temperature fluids, particularly steam under pressure, these rings must be able to function properly for numerous thermal cycles despite the adverse effects of such temperature, pressure, load cycles, and corrosion factors.

An example of a suitable weld ring material when the casings are used for injection of high temperature steam into wells is a corrosion resistant steel such as AISI 4130 or a similar steel compatible with the tubulars to which it is welded.

The annular space 16 of each casing between weld rings 20 is filled with a thermal insulating material 22. The appropriate insulating material utilized is determined by the use, by the available annular volume, and particularly by the extremes of temperature, to which the casing assembly is to be subjected. For example, when the casing assembly is to be used to inject steam into a well with a limited cross section, a high efficiency multilayered or multicellular insulation in a gas backfilled or evacuated environment is appropriate. Reference may be had to U.S. Pat. No. 4,415,184 for a disclosure of suitable insulation material 22.

Casings 10A and 10B are connected together in such a manner that fluid flowing through the inner tubular section of one casing can continue to flow smoothly into the inner tubular section of the adjacent casing without leakage. When casings 10A and 10B are properly joined, the ends of the inner tubulars 14 firmly engage a sealing ring 32 which forms a fluid seal to prevent fluid flowing in the inner tubular section entering the coupling cavity. As will be described in conjunction with FIG. 2, this sealing ring is recessed into the inner tubular inside diameter sufficiently to allow down hole tools to pass unobstructed. The ring is made of an appropriate alloy which can be one of several corrosion resistant materials such as 15-5PH stainless steel. The ring is sized to seal by pressure against the inner pipe as will be described below. The sealing surfaces are preferably protected from corrosion and/or oxidation in the elevated temperature environment by an appropriate plating or coating over the exposed steel alloy. A plating such as electrodeposited nickel over hard copper has been successfully used for this application, however a welded overlay of corrosion resistant alloy is equally suitable.

The gap between weld rings 20 of casings 10A and 10B is filled with gap insulation 36. This gap insulation may be materials of the type broadly referred to as high temperature compounded fluorocarbons, which are readily available from numerous sources such as DuPont Corporation. The purpose of gap insulation 36 is to provide a thermal barrier between the inner portion of the tubing and a coupling 38 threadedly joining these casings together. Since seal ring 32 effectively prevents leakage into the gap, the insulation in the gap and the coupling cavities operates at near atmospheric pressure resulting in maximum thermal efficiency for the insulation.

Figure 2:
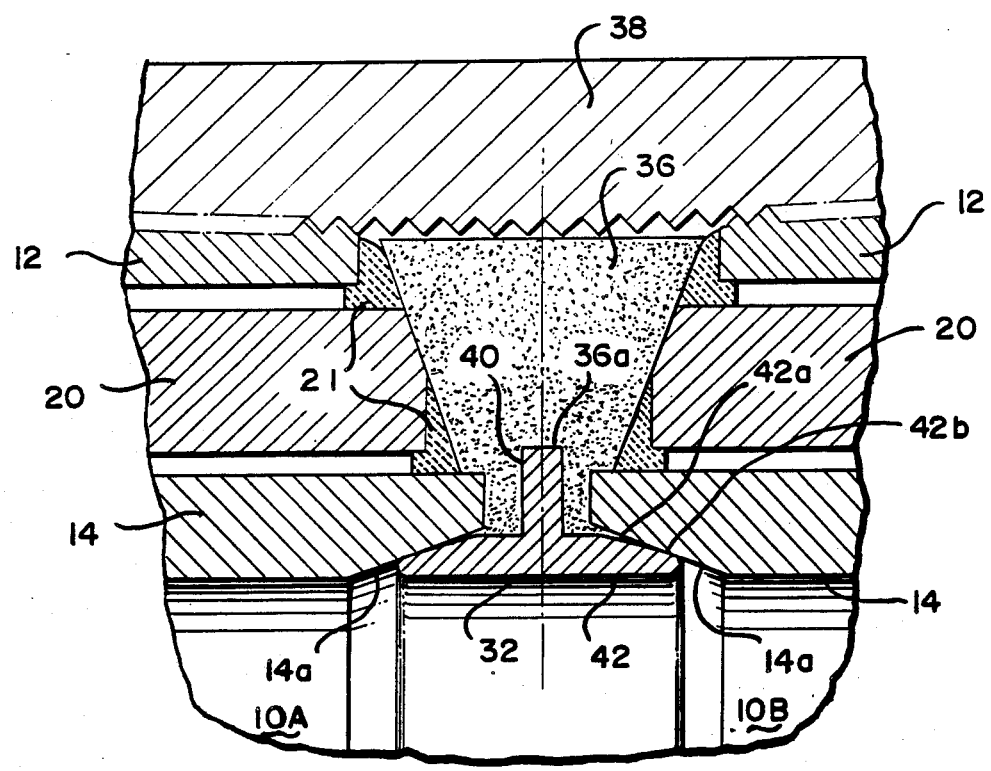
FIG. 2 is an enlarged, fragmentary sectional view of a portion of the joint in the insulated casing of FIG. 1.

Turning to FIG. 2, annular sealing ring 32 is more clearly seen to be formed having a radially outwardly projecting rib 40 flanked by opposed, axially extending sealing lips 42. The interior surfaces at the ends of the inner tubular sections 14 are outwardly tapered to provide seats 14a against which the outer tapered or conical surfaces of lips 42 engage when the joint between adjacent casings is made. It will be noted that the inner diameter of the sealing ring closely matches that of the inner tubular sections such as to provide a relatively smooth transition from casing to casing for the high temperature fluid being conveyed through the casing assemblies. The conical lip surfaces are provided with two diffferent degrees of taper indicated at 42a and 42b in FIG. 2, the latter matching the taper angle of inner tubular section seats 14a. The lips 42 are sufficiently flexible to accommodate slight axial misalignment of the inner tubular sections 14 as the joint is made by threaded coupling 38. Sealing ring rib 40 is seen to serve no sealing purpose, but is necessarily provided to prevent radial collapsing of the sealing ring as its lips are forcibly flexed into seating engagement with seats 14a. Coupling gap insulation 36 is fabricated with an annular groove 36a for receiving rib 40 of sealing ring 32 to assure proper positioning of the former in the coupling cavity. This insulation may be cast to the sealing ring or separately fabricated as one piece or laminated together from several smaller pieces and then assembled onto the sealing ring. In either case, the gap insulation and sealing ring are conveniently applied to each joint as a unit.

From the foregoing description, it is seen that joint sealing ring 32 provides an effective seal against the entry of high temperature fluids, e.g. steam, into the coupling cavity which would adversely affect the insulating capacity of gap insulation 36. Consequently, the illustrated sealing ring is in reality a thermal seal affording the casing joints an exceptional low thermal transfer characteristic. The creep resistance of the selected stainless steel sealing rings is such as to retain its sealing quality throughout a wide range of temperatures and over the intended useful life of the casing assembly. While the foregoing description refers to the conveyance of high temperature fluids, it will be appreciated that the illustrated casing assembly can be applied as well to the conveyance of low temperature fluids. That is, the low thermal loss characteristic of the illustrated joint is retained over operating temperatures ranging from −50° to over +700° Farenheit.

It will thus be seen that the objects set forth above and those made apparent from the preceding description are efficiently attained, and, since certain changes may be made in the above construction without departing from the scope of the invention, it is intended that all matters contained in the above description or shown in the accompanying drawing shall be interpreted as illustrative and not in a limiting sense.

Having described the invention, what is claimed as new and desired to secure by Letters Patent is:

1. An insulated casing assembly for conveying a high temperature fluid, said assembly comprising, in combination, a pair of casings each including concentric inner and outer tubular sections joined at their corresponding ends by separate ring members, the annular space between said inner and outer tubular sections being filled with thermal insulation material, the interior surfaces of said inner tubular section adjacent its ends being tapered to provide recessed sealing seats and the exterior surfaces of said outer tubular section being threaded adjacent its ends, a sealing ring having a radially outwardly extending rib and flexible oppositely axially extending sealing lips having tapered sealing surfaces, the inner diameter of said sealing ring being substantially equal to the inner diameter of said inner tubular sections, said sealing ring being positioned between adjacent ends of said pair of casings with said rib extending into the space between adjacent ends of said pair of casings, said sealing surfaces of said lips engaging said sealing seats of said annular tubular sections, and a threaded coupling sleeve engaging said threaded ends of said outer tubular sections and adapted when tightened to force said sealing surfaces of said lips into fluid and thermal sealing relation with said sealing seats, the width of said rib being such that the ends of said casings are out of contact with said rib when said seal is effected between said sealing ring and said casings.

2. The insulated casing defined in claim 1 wherein said sealing ring is formed of stainless steel.

3. The insulated casing assembly defined in claim 1 which further includes a annular, thermal insulation member positioned in said joint between said sealing ring and said coupling sleeve.

4. The insulated casing assembly defined in claim 1, wherein said sealing surfaces of said lips are formed having two different angles of taper.

5. The insulated casing assembly defined in claim 4, wherein one of said taper angles of said sealing surfaces substantially corresponds to the taper angle of said inner tubular section sealing seats.

6. The insulated casing assembly defined in claim 5, wherein said sealing ring is formed of stainless steel.

7. The insulated casing assembly defined in claim 6, which further includes an annular, thermal insulation member positioned in said joint between said sealing ring and said coupling sleeve.

8. The insulated casing assembly defined in claim 7, wherein said ring members are annular metallic members of rectangular cross-section welded to said corresponding ends of said inner and outer tubular sections.

* * * * *